(12) United States Patent  
Wallace et al.

(10) Patent No.: US 12,411,643 B2  
(45) Date of Patent: Sep. 9, 2025

(54) SYSTEM AND METHODOLOGY FOR DISPLAYING AN ADAPTIVE VIRTUAL SKY WITHIN AN AIRCRAFT CABIN

(71) Applicant: Gulfstream Aerospace Corporation, Savannah, GA (US)

(72) Inventors: Matthew Wallace, Savannah, GA (US); Amanda Johns, Savannah, GA (US); Kyle Collett, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 0 days.

(21) Appl. No.: 18/519,378

(22) Filed: Nov. 27, 2023

(65) Prior Publication Data

US 2025/0173110 A1    May 29, 2025

(51) Int. Cl.
| | |
|---|---|
| *G09G 5/14* | (2006.01) |
| *B64D 11/00* | (2006.01) |
| *G06F 3/041* | (2006.01) |
| *G06F 3/14* | (2006.01) |
| *G06V 20/56* | (2022.01) |

(52) U.S. Cl.
CPC ............ *G06F 3/1446* (2013.01); *B64D 11/00* (2013.01); *G06V 20/56* (2022.01); *B64D 2011/0038* (2013.01); *B64D 2011/0061* (2013.01)

(58) Field of Classification Search
None
See application file for complete search history.

(56) References Cited

U.S. PATENT DOCUMENTS

2014/0085337 A1* 3/2014 Velten ...................... G09G 5/14
                                                          345/635
2017/0286037 A1* 10/2017 Sizelove ............. H04W 12/088

* cited by examiner

*Primary Examiner* — Carl Adams
(74) *Attorney, Agent, or Firm* — Ingrassia Fisher & Lorenz, LLP

(57) ABSTRACT

An aircraft is disclosed here. An embodiment of the aircraft includes a cabin having a cabin ceiling, a display element arranged on the cabin ceiling and oriented to present visual content to an occupant of the cabin, a source of aircraft status data that provides aircraft status data corresponding to current operating status of the aircraft, and at least one video processor coupled to the source of aircraft status data. The video processor is configured to render image data corresponding to an adaptive virtual representation of the sky, wherein the image data is rendered based on at least some of the aircraft status data. The display element is coupled to the at least one video processor to receive the rendered image data, and is configured to display the adaptive virtual representation of the sky based on the received image data.

20 Claims, 10 Drawing Sheets

SYSTEM AND METHODOLOGY FOR DISPLAYING AN ADAPTIVE VIRTUAL SKY WITHIN AN AIRCRAFT CABIN

TECHNICAL FIELD

Embodiments of the subject matter described herein relate generally to vehicle display and entertainment systems. More particularly, embodiments of the subject matter relate to a system onboard an aircraft that generates an adaptive and dynamic display that includes a virtual representation of the sky, weather features, and/or celestial bodies during flight.

BACKGROUND

A vehicle (such as an aircraft) may include one or more display elements that are controlled to generate visual content for entertainment or informative purposes. Alternatively or additionally, a vehicle (such as an aircraft) may include light fixtures and lighting features for illumination of the vehicle cabin, for passenger safety, to create a pleasant ambiance, or the like. For example, a display monitor can be located on a cabin bulkhead, integrated into a wall or ceiling component, integrated into a seatback, or implemented as a drop-down component.

It is desirable to provide an improved or enhanced viewing experience for occupants of a vehicle, such as passengers of an aircraft. Furthermore, other desirable features and characteristics will become apparent from the subsequent detailed description and the appended claims, taken in conjunction with the accompanying drawings and the foregoing technical field and background.

BRIEF SUMMARY

Disclosed here is a display system for use onboard a vehicle having a cabin and a cabin ceiling. A disclosed embodiment of the display system includes: a source of vehicle status data, wherein the vehicle status data relates to current operating status of the vehicle; at least one video processor coupled to the source of vehicle status data, the at least one video processor configured to render image data corresponding to a virtual representation of environmental scenery outside the cabin, wherein the image data is rendered based on at least some of the vehicle status data; and a display element arranged on the cabin ceiling and oriented to present visual content to an occupant of the cabin, the display element coupled to the at least one video processor to receive the image data, and the display element configured to display the virtual representation of environmental scenery based on the received image data.

A disclosed embodiment of an aircraft includes: a cabin having a cabin ceiling; a display element arranged on the cabin ceiling and oriented to present visual content to an occupant of the cabin; a source of aircraft status data that provides aircraft status data corresponding to current operating status of the aircraft; and at least one video processor coupled to the source of aircraft status data, the at least one video processor configured to render image data corresponding to an adaptive virtual representation of the sky, wherein the image data is rendered based on at least some of the aircraft status data. The display element is coupled to the at least one video processor to receive the rendered image data, and the display element is configured to display the adaptive virtual representation of the sky based on the received image data.

Also presented here is a display system for use onboard an aircraft having a cabin and a cabin ceiling. A disclosed embodiment of the display system includes: a source of aircraft status data, wherein the aircraft status data comprises position data corresponding to current geographical position of the aircraft, and altitude data corresponding to current altitude of the aircraft; at least one video processor coupled to the source of aircraft status data, the at least one video processor configured to render image data corresponding to a virtual representation of the sky, wherein the image data is rendered based on the position data and the altitude data to adaptively adjust visual characteristics of the virtual representation of the sky in response to changes in the position data and in response to changes in the altitude data; and a display element arranged on the cabin ceiling and oriented to present visual content to an occupant of the cabin, the display element coupled to the at least one video processor to receive the image data, and the display element configured to display the adaptive virtual representation of the sky based on the received image data.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
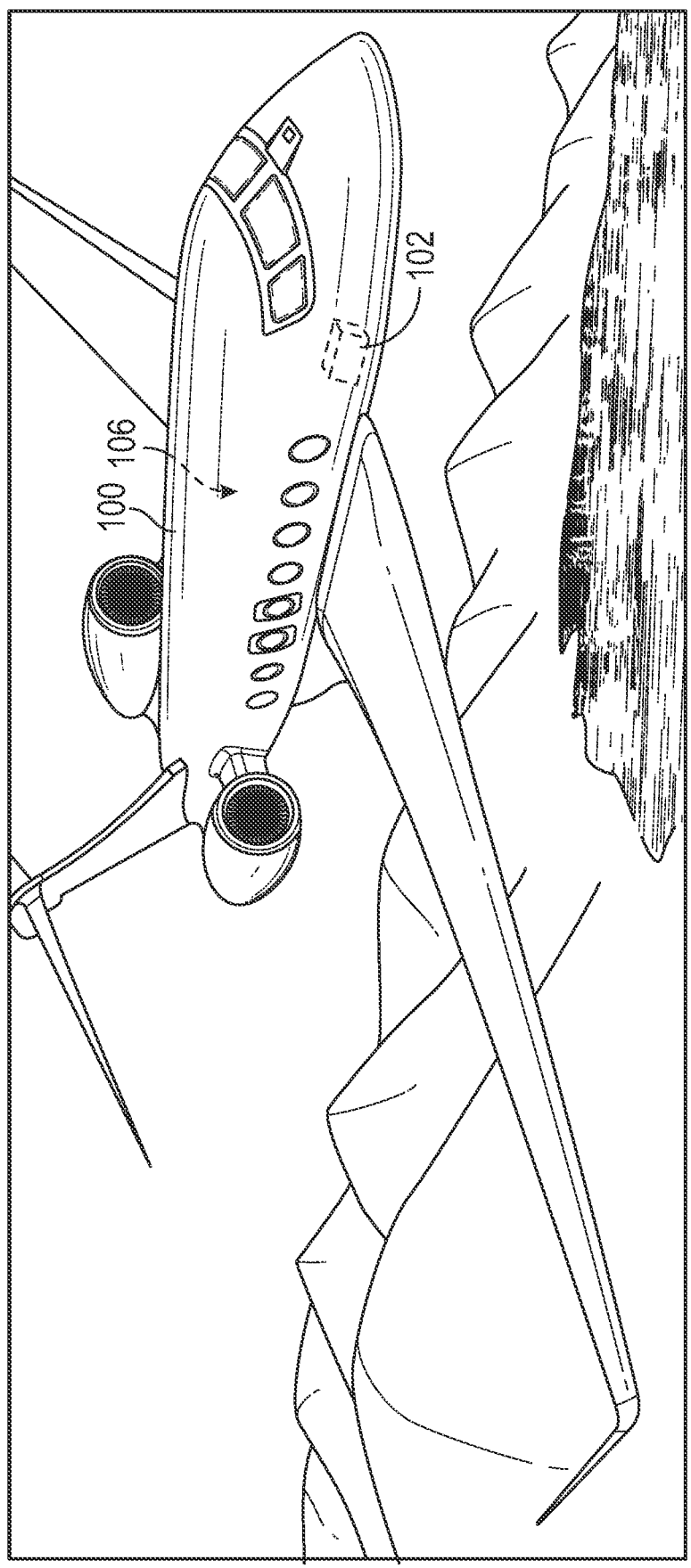
FIG. 1 is a diagram that depicts an aircraft during flight.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software, or the like, various elements of the systems and devices described herein are essentially the code segments or instructions that cause one or more processor devices to perform the various tasks. In certain embodiments, the program or code segments are stored in at least one tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

For the sake of brevity, conventional techniques related to vehicle control and navigation systems, vehicle display systems (including aircraft cabin display systems), vehicle instrumentation systems, the processing of image data, virtual and augmented reality systems and methodologies, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

A vehicle-based display system and related operating methodologies are disclosed herein. In accordance with certain non-limiting embodiments, the system is deployed onboard an aircraft such as an airplane. However, it should be appreciated that embodiments of the disclosed system can be utilized for other vehicle applications including, without limitation: trains; helicopters; automobiles; watercraft; monorails; amusement park rides; transportation systems; ski lifts; or the like.

FIG. 1 is a diagram that depicts an exemplary embodiment of an aircraft 100 during flight. The aircraft 100 includes or cooperates with one or more onboard aircraft systems 102 (schematically and arbitrarily depicted as a box in dashed lines), which may include, without limitation, any of the following in combination and in any number of iterations or multiples: a flight control system; a flight management system; a navigation system; a telemetry system; an avionics system; an instrumentation system; one or more display elements, devices, or components; an imaging system that includes one or more cameras; an image/video processing system including one or more video processors; an alerting system; a messaging or notification system for the flight crew; a global positioning system (GPS) receiver; various sensor devices or components. In certain embodiments, the onboard aircraft systems 102 include one or more components or subsystems that cooperate to generate, render, and display a virtual representation of environmental scenery outside the aircraft 100 (e.g., a virtual representation of the sky as it might appear outside the aircraft 100). For example, the onboard aircraft systems 102 may include or cooperate with the items included with the exemplary system configuration depicted in FIG. 2. Although FIG. 1 represents the various onboard aircraft systems 102 as a single block, it should be understood that an embodiment of the aircraft 100 will implement the onboard aircraft systems 102 with a variety of different physical, logical, and computer-implemented components.

The depicted embodiment of the aircraft 100 includes a cabin 106 to accommodate occupants of the aircraft 100. The cabin 106 includes at least some of the interior space of the aircraft 100 that is typically reserved for passenger seating, fixtures, a galley, etc. The cabin 106 includes a cabin ceiling (hidden from view in FIG. 1, but shown in FIG. 4) that can define a boundary of the interior space of the cabin. As explained in more detail below, at least one display element can be mounted to, coupled to, integrated in, or deployed from the cabin ceiling and operated in an appropriate manner to present a virtual representation of the sky to occupants of the cabin 106.

In accordance with certain embodiments, a display system onboard the aircraft 100 leverages status data from one or more sources to calculate the current position/orientation of the sun, moon, or other celestial object relative to the aircraft. Based on the obtained status data, the system determines various visual characteristics or effects to be used with the adaptive virtual representation of the sky, e.g., the intensity of the light, how the sky is colored, variations in the color spectrum and color transitions, etc. As the flight progresses, the adaptive virtual sky will transition through a day-night cycle as required to gradually shift to the appearance of the actual sky at the location and time of the flight destination. In certain implementations, authorized users can control certain display characteristics or parameters of the virtual sky, such as how and when the appearance of the virtual sky transitions.

The virtual sky can be presented on any video-capable imaging device or display element. The adaptive virtual sky will be able to position the sun/moon accurately relative to the current aircraft location or any other global location. The virtual sky can simulate the position of stars or other celestial objects based on the current aircraft location or any other global location. Clouds and other weather conditions can be added to the virtual sky, based on user input, current weather data obtained by the aircraft, weather forecast data, or the like. In certain implementations, the virtual sky can be augmented with additional visual content, e.g., informative text, identifying icons or labels, graphical user interface objects, or the like.

Figure 2:
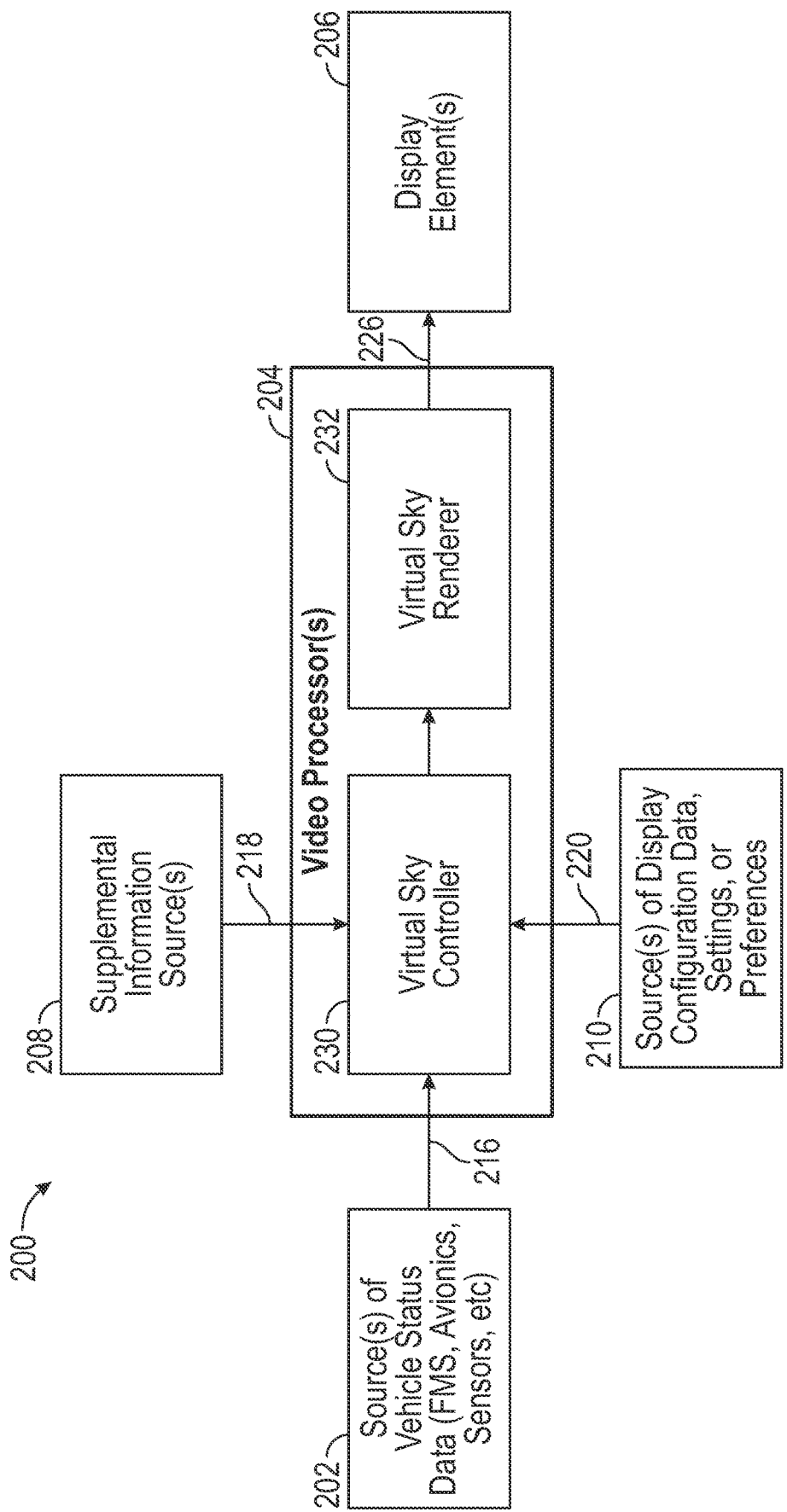
FIG. 2 is a simplified block diagram representation of a system onboard an aircraft that is configured in accordance with certain embodiments of the invention to generate and display a virtual representation of an environment external to the aircraft during flight.

FIG. 2 is a simplified block diagram representation of a display system 200 for use onboard a vehicle, such as an aircraft. The system 200 is configured in accordance with certain embodiments of the invention to display a virtual sky (preferably using a display element located on the cabin ceiling) during operation of an aircraft. FIG. 2 depicts various systems and components that may be onboard the aircraft 100 shown in FIG. 1. Indeed, the onboard aircraft systems 102 shown in FIG. 1 may include any or all of the components depicted in FIG. 2. The illustrated embodiment of the system 200 includes, without limitation: at least one source of vehicle (e.g., aircraft) status data 202; at least one video processor 204; and at least one display element 206. An embodiment of the system 200 may also include or cooperate with at least one supplemental information source 208 and/or with at least one source of display configuration data, settings, or preferences 210. A deployed implementation of the system 200 may include additional systems and components (as needed or desired), and/or alternative systems and components (as needed or desired). FIG. 2 is merely an illustrative example that depicts certain systems and components that support the inventive subject matter described herein.

A source of aircraft status data 202 is suitably configured and operated to provide aircraft status information or status data 216 that relates to, corresponds to, or is otherwise associated with the current operating status of the host aircraft. Accordingly, a source of aircraft status data 202 can be realized as one or more components or devices onboard the aircraft, e.g., sensor hardware, a computer based device or subsystem, or the like. As schematically depicted in FIG. 2, the at least one video processor 204 is coupled to the source(s) of aircraft status data 202 such that the relevant status data 216 can be provided to the video processor(s) 204 in an ongoing manner or otherwise as needed.

In accordance with certain embodiments, the source of aircraft status data 202 provides at least the following: position data corresponding to the current geographical position of the aircraft; and altitude data corresponding to the current altitude of the aircraft. Accordingly, the source of aircraft status data 202 may include, cooperate with, or be realized as a suitably configured navigation, geolocation, or tracking system that generates the position data. In certain implementations, a GPS or equivalent geolocation system can be leveraged to provide the position data. The altitude data can be obtained from an altimeter onboard the host aircraft. The aircraft status data 202 may also include attitude data that is associated with the pitch, roll, and yaw status of the aircraft. In this regard, the source of aircraft status data 202 may include or cooperate with an inertial reference system onboard the aircraft, which can utilize any number of sensors, an inertial measurement unit, or the like. In certain implementations, the source of aircraft status data 202 may be a flight management system (FMS), a flight control system, an avionics system, or the like.

The aircraft status data 216 may also include current date and time information, which can indicate a current time zone in which the aircraft is located. The aircraft status data 216 may also include or be associated with travel plan (e.g., flight plan) information that indicates the planned departure time zone and/or the planned destination time zone for the intended travel plan. The aircraft status data 216 can include any other useful information, data, or measurements that are generated onboard the aircraft, received by the aircraft, and/or accessible by various onboard subsystems, computer modules, or instruments. As additional non-limiting examples, the aircraft status data 216 may include or indicate: the overall flight time (or travel distance); speed (which can be used to render motion blur and/or other visual effects that relate to the current vehicle speed); information related to connectivity systems (e.g., satellite systems, their operational status, which one is in use, data rate or bandwidth, etc.). The particular types of aircraft status data 216 mentioned here are non-limiting examples of typical and exemplary data that can be utilized to generate and render a virtual sky for display onboard an aircraft.

As mentioned previously, the system 200 may also include or communicate with any number of supplemental information sources 208. A supplemental information source 208 may be implemented as one or more components or devices onboard the aircraft, e.g., sensor hardware, a computer based device or subsystem, or the like. Alternatively or additionally, a supplemental information source 208 may be a component, a system, a service, or a device that is external or remote relative to the host aircraft (but can communicate with the aircraft). In this regard, a supplemental information source 208 can be coupled to the video processor(s) 204 to provide supplemental data 218 that influences at least some visual characteristics of the virtual sky that is rendered and displayed by the system 200. For purposes of this description, supplemental data 218 need not be related to the operating status or condition of the host vehicle, and need not originate onboard the host vehicle. In this regard, supplemental data 218 may include or be realized as any of the following, without limitation: map data; calendar data; almanac data; astronomical data; weather data that describes current weather conditions in a region near the aircraft, weather conditions at a planned destination of the aircraft, and/or weather conditions at a waypoint along the flight plan of the aircraft. In certain implementations, supplemental data 218 may include or identify information related to manmade satellites or objects (which can be used to depict satellite constellations, orbiting objects, space stations, or the like). Accordingly, the supplemental information source(s) 208 may include or communicate with one or more systems, service providers, measurement systems, sensors, or instruments that are configured and operated to provide relevant supplemental data 218 that can be used by the system 200.

As mentioned previously, the system 200 may also include or communicate with one or more sources of display configuration data, settings, or preferences 210. A source of display configuration data, settings or preferences 210 may be implemented as a component or device that is integrated with the hardware onboard the aircraft. Alternatively or additionally, a source 210 may be a component, a system, a service, or a device that is suitably configured to communicate with the system 200 in a compatible manner. In this regard, a source of display configuration data, settings, or preferences 210 can be coupled to the video processor(s) 204 to provide display configuration data 220 that influences at least some visual characteristics of the virtual sky that is rendered and displayed by the system 200. In certain embodiments, the display configuration data 220 may represent "factory preset" information, automatically generated information, user-configurable or user-selectable information, or the like. The display configuration data 220 may influence any or all of the following display characteristics, without limitation: enable or disable display of the virtual sky; display brightness; display contrast; color characteristics; active/inactive display periods; sky coloring; cloud density; cloud patterns; weather patterns; virtual time of day; brightness of celestial objects (stars, the moon, the sun, constellations, planets, *meteors*); dynamic or adaptive behavior of the displayed virtual sky.

Figure 10:
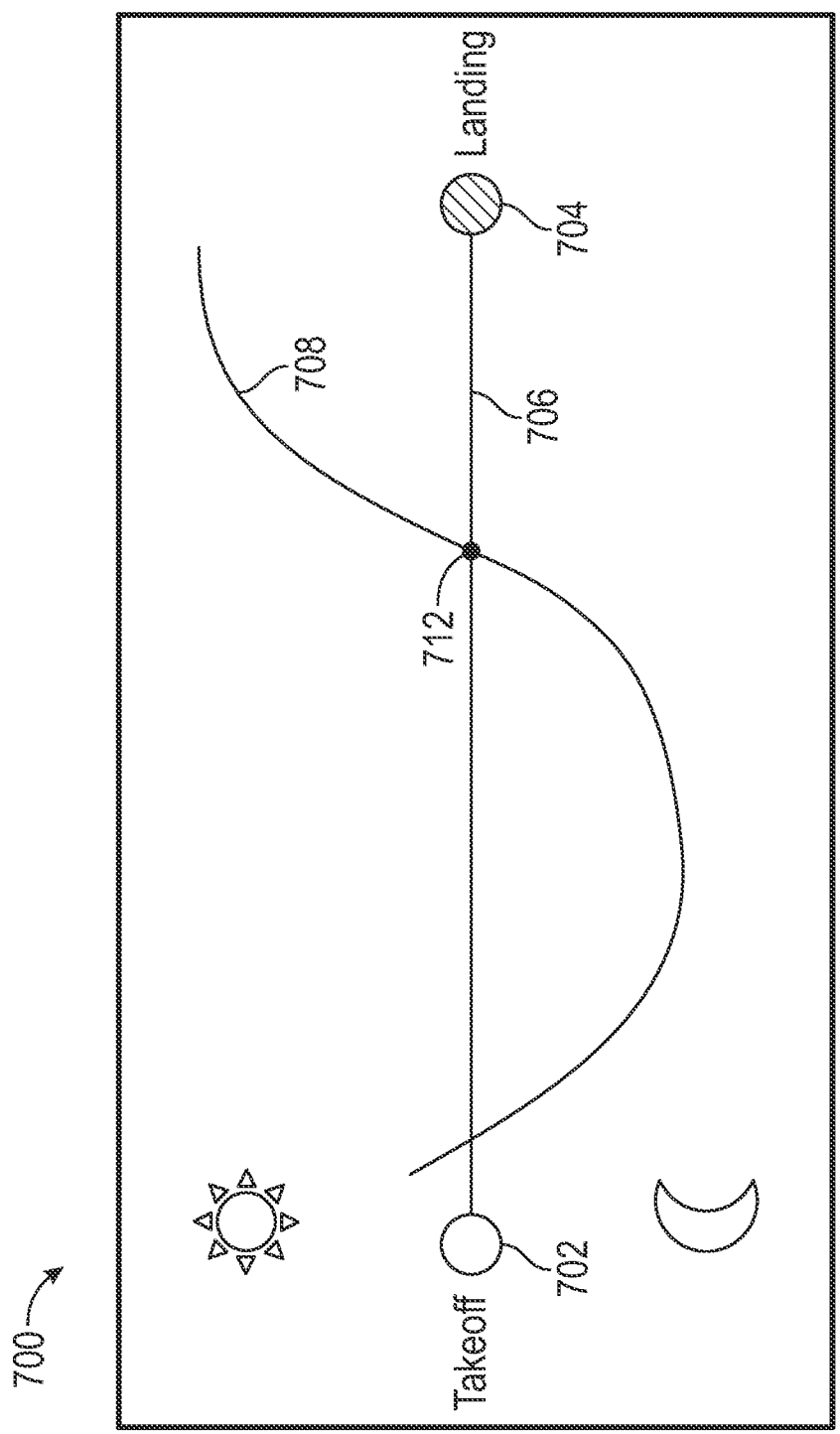
FIG. 10 is a schematic representation of a graphical user interface that can be manipulated to control certain visual characteristics of a displayed virtual sky.

In practice, a source of display configuration data, settings, or preferences 210 can be realized as a control panel or piece of equipment in the cabin of the vehicle. Alternatively or additionally, a smartphone, a tablet device, or any mobile or portable computing device can serve as a source of display configuration data, settings, or preferences 210 (using, for example, a suitably configured software program or mobile app, a web browser based user interface, or the like). Accordingly, an occupant of the aircraft having appropriate credentials can adjust certain display settings to alter or control the visual characteristics of the virtual sky that is displayed in the cabin. FIG. 10 and the related description below are directed to an exemplary user interface that can be used to adjust the visual characteristics of the displayed virtual sky.

In accordance with the illustrated embodiment, the at least one video processor 204 is coupled to the source(s) of aircraft status data 202, the supplemental information source(s) 208, and the source(s) of display configuration data, settings, or preferences 210. The at least one video processor 204 is suitably configured and operated to respond to at least some of the data and information provided by these sources 202, 208, 210 for purposes of generating a virtual representation of environmental scenery (e.g., a virtual sky) outside the cabin. More specifically, the at least one video processor 204 obtains data from one or more of the sources 202, 208, 210, and processes the obtained data to generate image data 226 that corresponds to the desired virtual representation of the sky.

The at least one video processor 204 may include any combination of software, firmware, hardware, etc. For example, the video processor(s) 204 may include an application specific integrated circuit (ASIC), an electronic circuit, a microprocessor device and memory that executes one or more software or firmware programs, a combinational logic circuit, and/or other suitable components that provide the described functionality. In accordance with certain embodiments, the at least one video processor 204 may include a module, computer program instructions, and/or processing logic associated with a virtual sky controller 230. In this regard, the virtual sky controller 230 is configured to determine and create the visual and graphical characteristics of the virtual sky, based on data obtained from one or more of the sources 202, 208, 210. In certain embodiments, the virtual sky controller 230 operates in an adaptive manner such that the visual characteristics of the virtual sky are updated in real-time or substantially real-time during flight. The at least one video processor 204 may also include a module, computer program instructions, and/or processing logic associated with a virtual sky renderer 232. To this end, the virtual sky renderer 232 processes the output of the virtual sky controller 230 to generate the rendered image data 226. Thus, the image data 226 is rendered based on at least some of the aircraft status data that is provided by the source of aircraft status data 202. In certain embodiments, the virtual sky renderer 232 includes or is implemented as a 3D graphics engine, a 3D gaming engine, or a video rendering tool that can generate the desired visual content for presentation on the display element(s) 206. Although not separately depicted in FIG. 2, the at least one video processor 204 may be suitably configured and operated to perform additional or alternative image or video processing routines to supplement or augment the virtual sky imagery.

Each display element 206 is coupled to the video processor(s) 204 to receive the rendered image data 226. Each display element 206 functions in a conventional manner to display image/video content that corresponds to the received image data 226 (for purposes of displaying the adaptive virtual sky). A compatible display element 206 can be implemented and deployed in various ways onboard the aircraft. In accordance with the exemplary embodiments described here, the system 200 employs at least one display element 206 that is curved in accordance with the contour of the cabin ceiling (see FIG. 4). To this end, a display element 206 can be realized as a curved OLED monitor, an LED matrix, a projector device or system, or the like. Alternatively or additionally, a display element 206 may be realized as a straight or curved component that is integrated with or mounted to a sidewall, bulkhead, or other interior feature of the cabin. These and other practical mounting locations within the cabin are contemplated by this disclosure.

Figure 3:
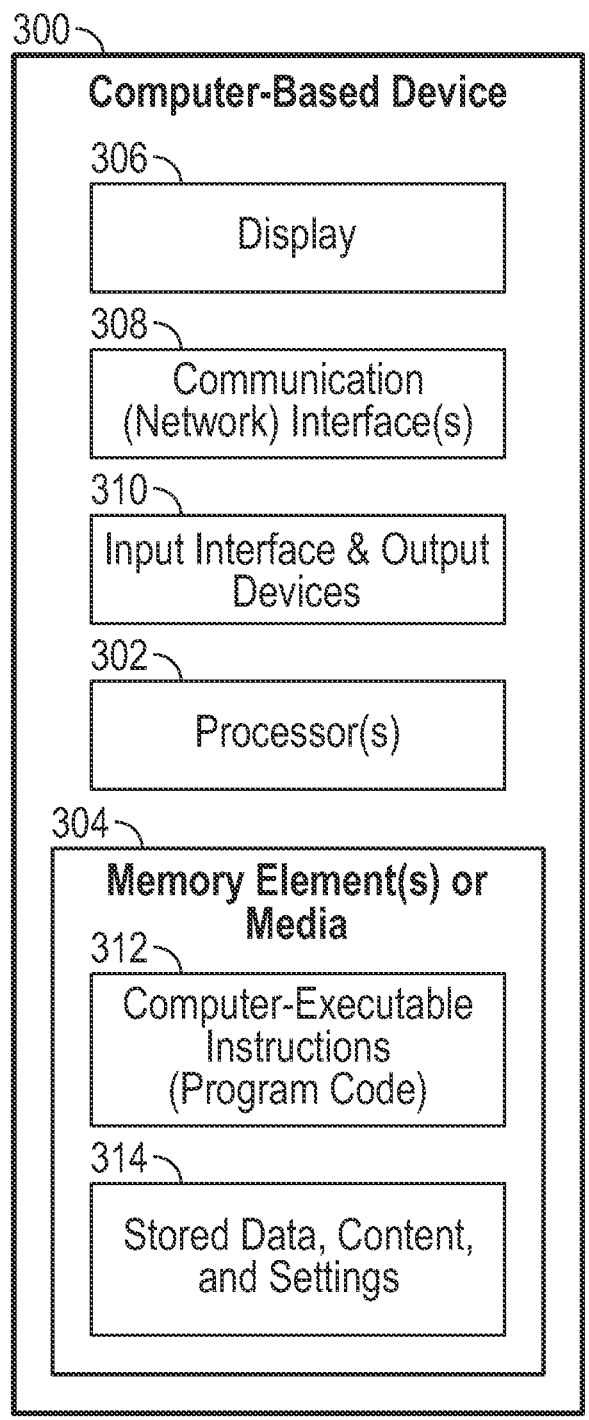
FIG. 3 is a block diagram of an exemplary embodiment of a computer-based device.

In accordance with certain embodiments, an aircraft system 102 (as depicted in FIG. 1), and one or more of the items depicted in FIG. 2 can be implemented as at least one computer-based or processor-based device, system, or piece of equipment. In this regard, FIG. 3 is a simplified block diagram representation of an exemplary embodiment of a computer-based device 300, which may be used to implement certain devices or systems onboard the aircraft 100.

The device 300 generally includes, without limitation: at least one processor 302; at least one memory storage device, storage media, or memory element 304; a display 306; at least one communication (network) interface 308; and input and output (I/O) devices 310, such as an input interface, one or more output devices, one or more human/machine interface elements, or the like. In practice, the device 300 can include additional components, elements, and functionality that may be conventional in nature or unrelated to the particular application and methodologies described here.

A processor 302 may be, for example, a central processing unit (CPU), a field programmable gate array (FPGA), a microcontroller, an application specific integrated circuit (ASIC), or any other logic device or combination thereof. One or more memory elements 304 are communicatively coupled to the at least one processor 302, and can be implemented with any combination of volatile and non-volatile memory. The memory element 304 has non-transitory machine-readable and computer-executable instructions (program code) 312 stored thereon, wherein the instructions 312 are configurable to be executed by the at least one processor 302 as needed. When executed by the at least one processor 302, the instructions 312 cause the at least one processor 302 to perform the associated tasks, processes, and operations defined by the instructions 312. Of course, the memory element 304 may also include instructions associated with a file system of the host device 300 and instructions associated with other applications or programs. Moreover, the memory element 304 can serve as a data storage unit for the host device 300. For example, the memory element 304 can provide storage 314 for aircraft data, navigation data, sensor data, measurements, image and/or video content, settings or configuration data for the aircraft or its onboard systems, and the like.

The display 306 (if deployed with the particular embodiment of the device 300) may be integrated with the device 300 or communicatively coupled to the device 300 as a peripheral or accessory component. The shape, size, resolution, and technology of the display 306 will be appropriate to the particular implementation of the device 300. The display 306 can be realized as a monitor, touchscreen, or another conventional electronic display that is capable of graphically presenting data and/or information provided by the device 300.

The communication interface 308 represents the hardware, software, and processing logic that enables the device 300 to support data communication with other devices. In practice, the communication interface 308 can be suitably configured to support wireless and/or wired data communication protocols as appropriate to the particular embodiment. For example, the communication interface 308 can be designed to support an aircraft network protocol, a cellular communication protocol, a short-range wireless protocol (such as the BLUETOOTH communication protocol), and/or a WLAN protocol. As another example, if the device 300 is a desktop or laptop computer, then the communication interface can be designed to support the BLUETOOTH communication protocol, a WLAN protocol, and a LAN communication protocol (e.g., Ethernet). In accordance with certain aircraft applications, the communication interface 308 is designed and configured to support one or more onboard network protocols used for the communication of information between devices, components, and subsystems of the aircraft 100.

The I/O devices 310 enable the user of the device 300 to interact with the device 300 as needed. In practice, the I/O devices 310 may include, without limitation: an input interface to receive data for handling by the device 300; a speaker, an audio transducer, or other audio feedback component; a haptic feedback device; a microphone; a mouse or other pointing device; a touchscreen or touchpad device; a keyboard; a joystick; a biometric sensor or reader (such as a fingerprint reader, a retina or iris scanner, a palm print or palm vein reader, etc.); a camera; a lidar sensor; or any conventional peripheral device. In this context, a touchscreen display 306 can be categorized as an I/O device 310. Moreover, a touchscreen display 306 may incorporate or be controlled to function as a fingerprint or palm print scanner. A haptic feedback device can be controlled to generate a variable amount of tactile or physical feedback, such as vibrations, a force, knock, or bump sensation, a detectable movement, or the like. Haptic feedback devices and related control schemes are well known and, therefore, will not be described in detail here.

Figure 4:
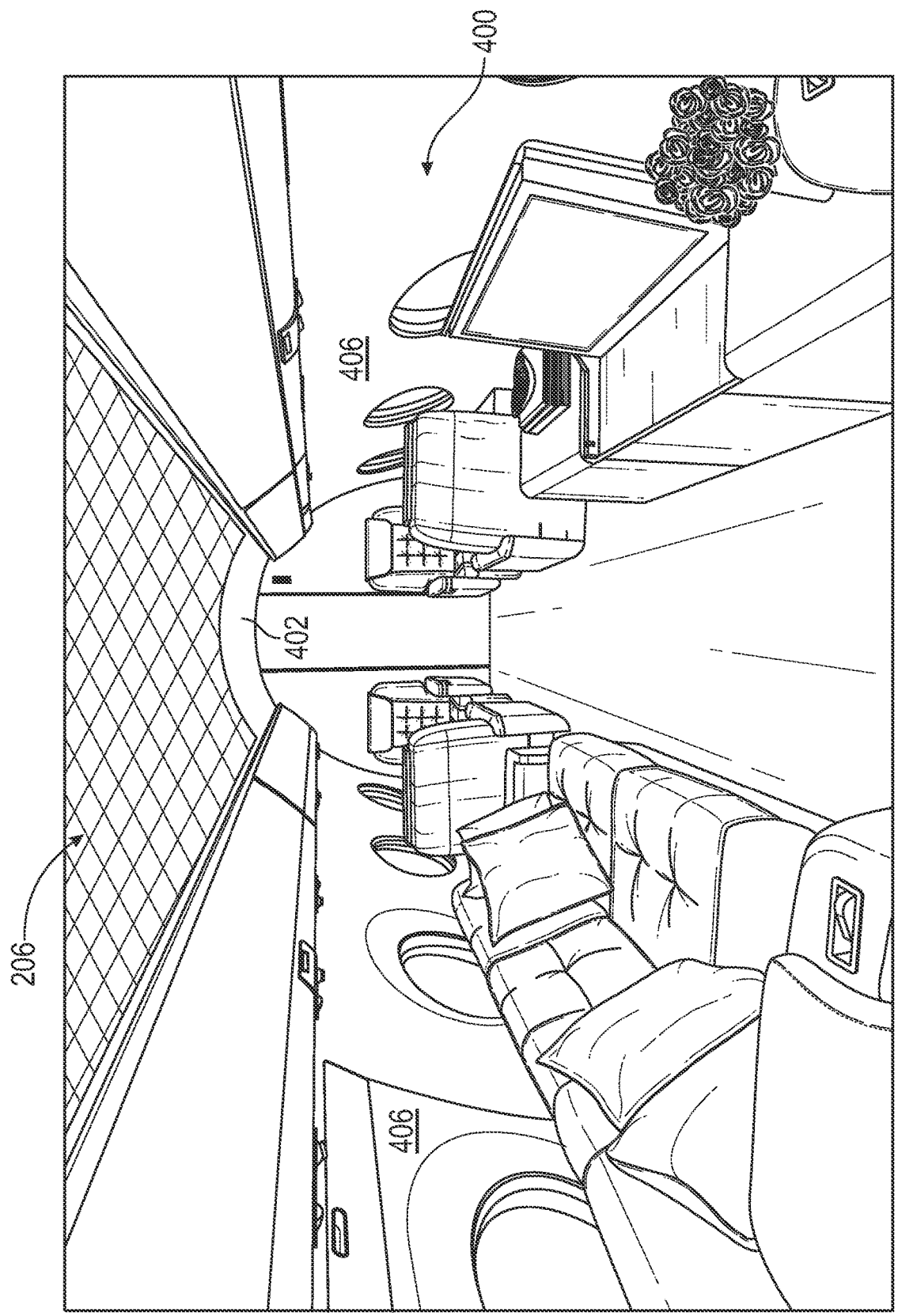
FIG. 4 is a perspective view that depicts a portion of an aircraft cabin.

FIG. 4 is a perspective view that depicts a portion of an aircraft cabin 400 (e.g., the cabin 106 of the aircraft 100 depicted in FIG. 1. The depicted embodiment of the cabin 400 includes a contoured cabin ceiling 402 that is curved to resemble an arch. In other words, the cabin ceiling 402 includes a concave region. The display element(s) 206 of the system 200 can be arranged on, integrated with, or deployed from the cabin ceiling 402. FIG. 4 includes only one display element 206 (illustrated with cross-hatched shading). Although not always required, the display element 206 can be curved in accordance with the contour of the cabin ceiling 402, as shown in FIG. 4. The display element 206 is arranged on the cabin ceiling 402 and is oriented to present visual content to an occupant of the cabin 400. In other words, the display element 206 is visible to passengers inside the cabin 400. This enables the display element 206 to function as a virtual sunroof/moonroof for the aircraft. Although not shown in FIG. 4, the cabin 400 may include a display element arranged on, integrated with, or deployed from an interior sidewall 406, and operated in the manner described here to present a virtual representation of the environment outside the aircraft.

Figure 5:
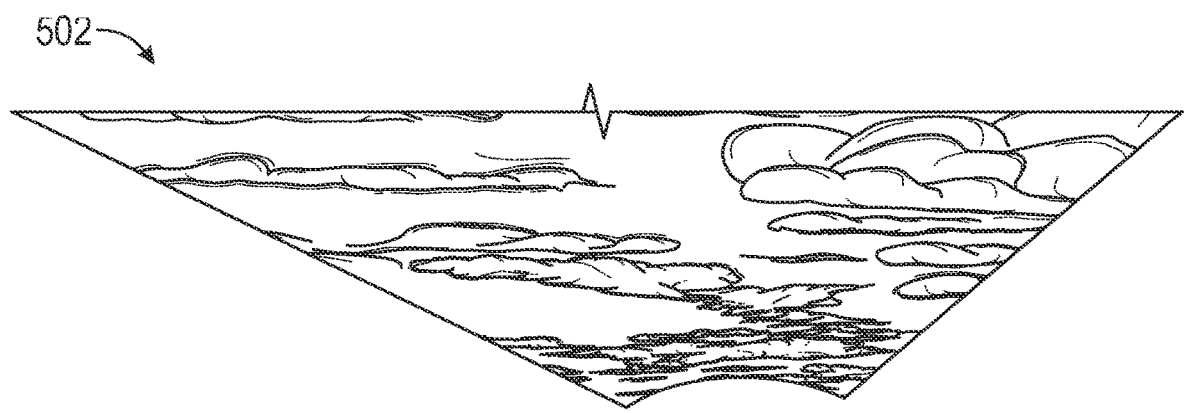
FIGS. 5-8 depict different representations of a virtual sky as displayed on a display element onboard an aircraft.
Figure 6:
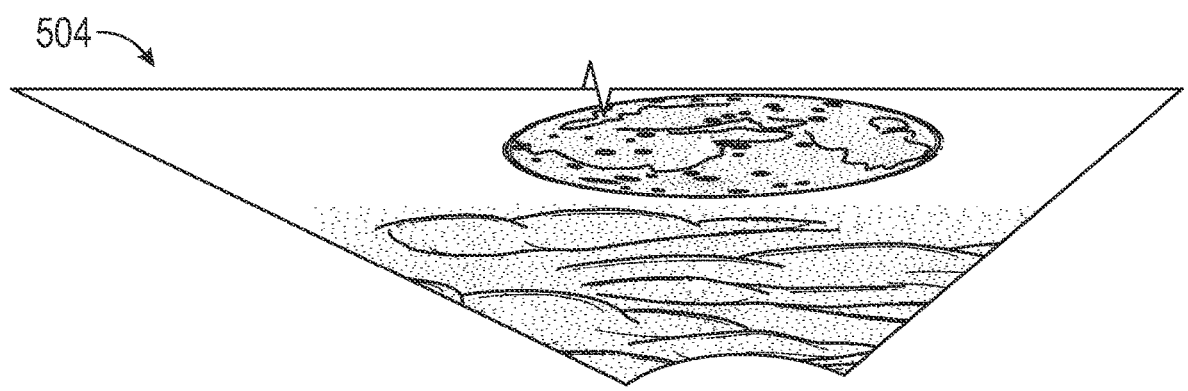
Figure 7:
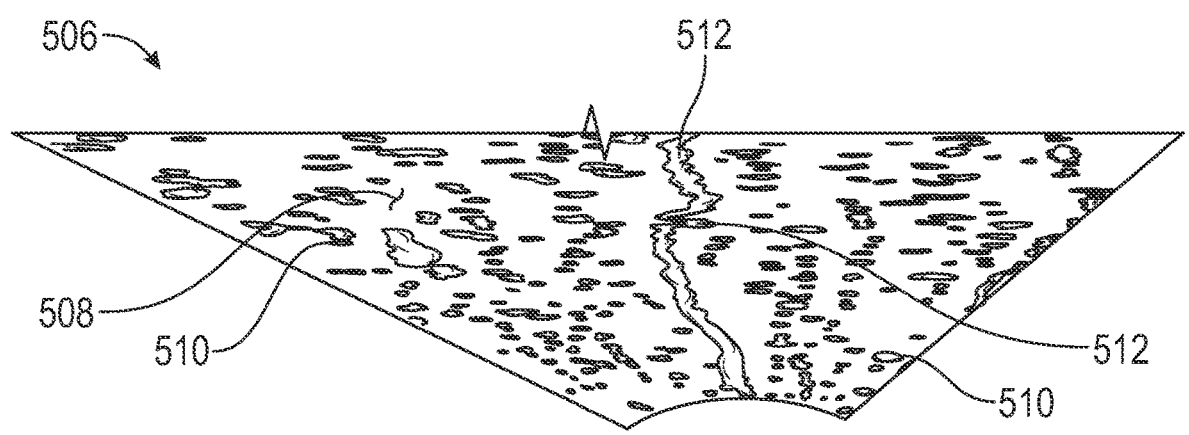
Figure 8:
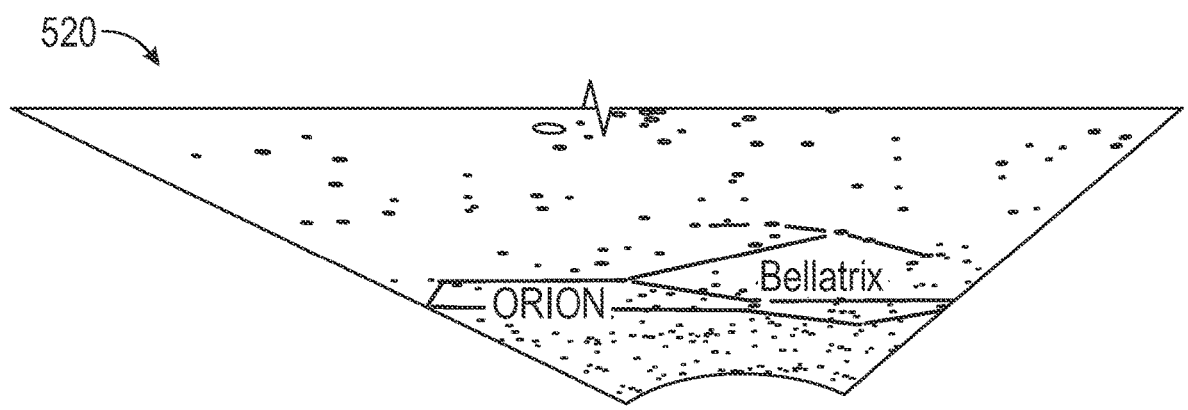

FIGS. 5-8 depict different representations of a virtual sky as displayed on a display element, such as the display element 206 deployed on the cabin celling 402 in FIG. 4. FIG. 5 shows a virtual sky 502 with visible clouds, a sunrise or sunset, and other visual characteristics that are intended to emulate the actual appearance of the sky outside the aircraft (e.g., color content, brightness, contrast, shadow effects, presence of celestial objects). FIG. 6 shows a virtual sky 504 after dark, with visible clouds, the moon, and other visual characteristics that are intended to emulate the actual appearance of the sky outside the aircraft. FIG. 7 shows a virtual sky 506 during a rainstorm, with dark clouds, a gray sky tone, and other visual characteristics that are intended to emulate the actual appearance of the sky outside the aircraft. The image data for the virtual sky 506 is generated and rendered to include a virtual representation of a transparent or translucent window 508 with water drops 510 and/or flowing water 512 that appears to be on the outer surface of the window 508. FIG. 8 shows a virtual sky 520 at night, with a dark sky tone, a number of stars, little to no visible cloud cover, and other visual characteristics that are intended to emulate the actual appearance of the sky outside the aircraft (e.g., color content, brightness, contrast, shadow effects, presence of celestial objects). The image data for the virtual sky 520 is generated and rendered to include augmented visual content (e.g., graphics and/or text) associated with objects or content contained in the virtual sky. For example, the virtual sky 520 can be rendered with labels that identify stars, planets, constellations, meteors, or other celestial objects. As another example, the virtual sky 520 can be rendered with lines, markers, or graphics that identify groups of stars, constellations, or other celestial features or objects.

Figure 9:
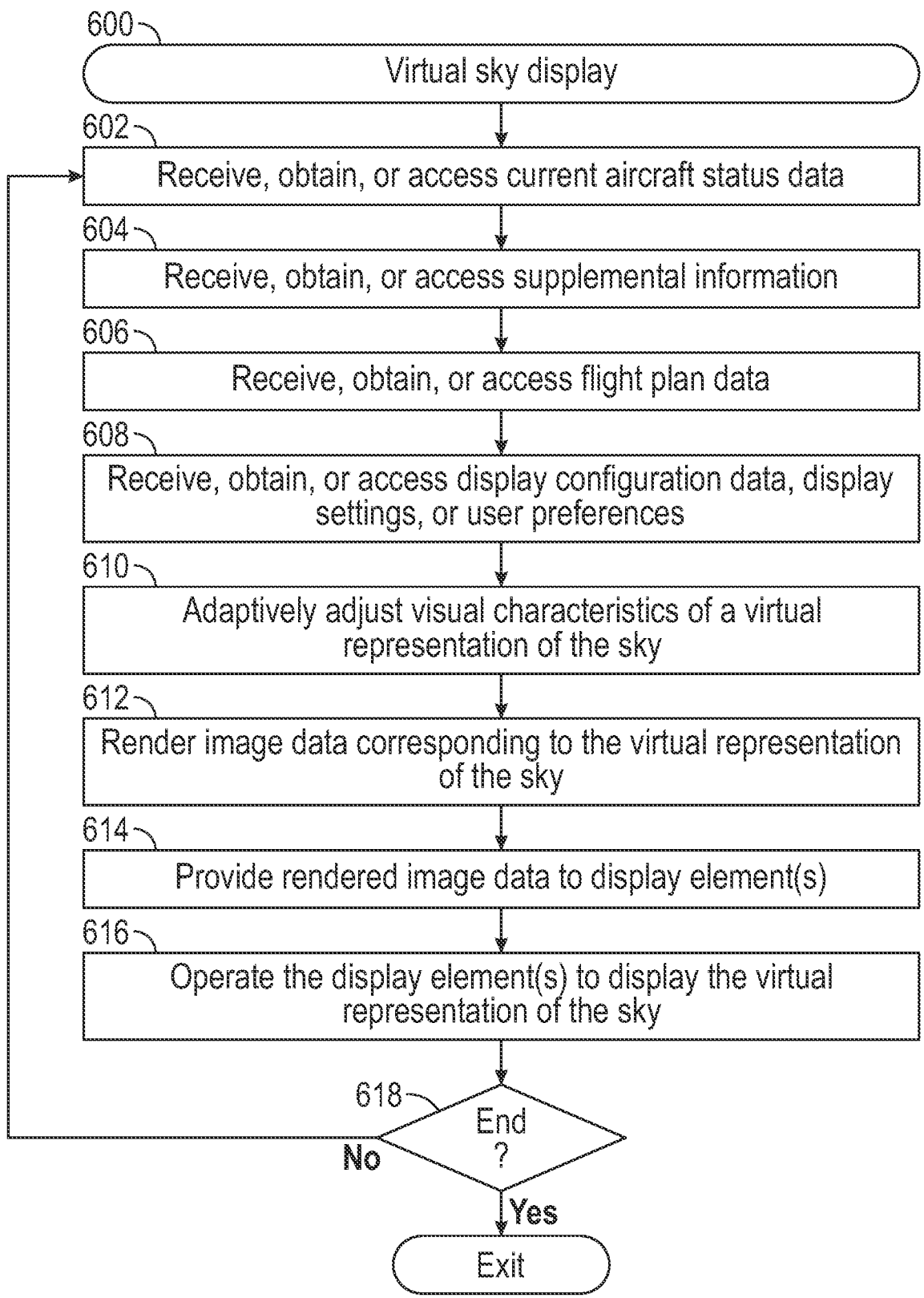
FIG. 9 is a flow chart that illustrates an exemplary embodiment of a virtual sky display process.

FIG. 9 is a flow chart that illustrates an exemplary embodiment of a virtual sky display process 600. The various tasks performed in connection with the process 600 may be performed by software, hardware, firmware, or any combination thereof. For illustrative purposes, the following description of the process 600 may refer to elements, features, or content mentioned above in connection with FIGS. 1-8. In practice, portions of the process 600 may be performed by different elements of the described system, e.g., a video processor, a display element, or a source of status data that influences the visual content that is to be displayed. It should be appreciated that the process 600 may include any number of additional or alternative tasks, the tasks shown in FIG. 9 need not be performed in the illustrated order, and the process 600 may be incorporated into a more comprehensive procedure or process having additional functionality not described in detail herein. Moreover, one or more of the tasks shown in FIG. 9 could be omitted from an embodiment of the process 600 as long as the intended overall functionality remains intact.

The process 600 depicted and described here may begin by receiving, obtaining, or accessing current aircraft status data that describes, indicates, or otherwise relates to the current operating status of the host aircraft (task 602). The aircraft status data may include, for example: date and time information; position data for the aircraft; altitude data for the aircraft; attitude data for the aircraft; flight plan data for the aircraft, or the like. The process 600 may also receive, obtain, or access supplemental data or information from one or more sources (task 604). The supplemental data may include, for example, date and time information; weather data; time zone information associated with an intended destination and/or planned waypoint of the aircraft; or the like. The process 600 may also receive, obtain, or access flight plan data or information for the aircraft (task 606), if not already included with the aircraft status data and/or the supplemental data. In this regard, the flight plan data corresponds to the intended travel route from a departure location (in a departure time zone) to a destination location (in a destination time zone). The flight plan data may also include other information, such as: a scheduled or estimated departure time; a scheduled or estimated arrival time; anticipated flight speed and/or altitude for various segments of the flight; and waypoint locations along the planned route. The process may also receive, obtain, or access display configuration data, display settings, or user preferences that can influence certain visual characteristics and/or the behavior of the virtual sky (task 608). In this regard, the configuration data, display settings, and/or user preferences may control or influence any number of visual characteristics (as described above with reference to FIG. 2).

The process 600 continues by adaptively controlling or adjusting the visual characteristics of a virtual representation of the sky (task 610). The visual characteristics of the adaptive virtual sky can be based on at least some of the obtained aircraft status data, at least some of the obtained supplemental information, at least some of the obtained flight plan data, and/or at least some of the obtained display configuration data. For example, the video processor(s) of the display system can render the image data such that certain visual characteristics of the virtual representation of the sky are adaptively updated in accordance with position data and altitude data of the aircraft. The position and altitude data can be used to determine the position of the sun/moon relative to the aircraft, which in turn can be used to adaptively adjust the colors, brightness, and other lighting characteristics of the virtual sky.

As another example, the video processor(s) of the display system can render the image data such that certain visual characteristics of the virtual representation of the sky are adaptively updated in accordance with the current date and time. The date and time information can also be used to determine or estimate the current position of the sun/moon relative to the aircraft, which in turn can be used to adaptively adjust the colors, brightness, and other lighting characteristics of the virtual sky.

As another example, the video processor(s) of the display system can render the image data such that certain visual characteristics of the virtual representation of the sky are adaptively updated in accordance with the current weather conditions in a region near the aircraft. In this regard, the displayed characteristics and visual imagery of the virtual sky can be adaptively updated to be consistent with the actual current weather conditions.

As yet another example, the video processor(s) of the display system can render the image data such that certain visual characteristics of the virtual representation of the sky are consistent with a view of the actual environmental scenery (the sky) in the destination time zone corresponding to the intended destination of the aircraft. In certain scenarios, the virtual sky is rendered to emulate or visually match the sky as it should appear to someone located in the destination time zone, regardless of the real-time geographic location of the aircraft. This feature is appropriate for long flights that span multiple time zones. For long flights, artificially adjusting the appearance of the virtual sky can impact the circadian rhythm of the cabin occupants, which in turn can help alleviate the effects of jet lag. To this end, the system can intelligently control the daytime/nighttime appearance of the virtual sky in a manner that is intended to expedite the human body's natural response when transitioning from one time zone to another.

In accordance with a similar example, the video processor(s) of the display system can receive an interpolated, artificial, or user-defined time zone that is adjustable between the actual departure time zone and the actual destination time zone (which corresponds to the intended destination location of the aircraft). In response to the received time zone parameters, the video processor(s) renders the image data such that certain visual characteristics of the virtual representation of the sky are consistent with a view of the sky in the interpolated, artificial, or user-defined time zone (instead of the actual current time zone). Accordingly, the view of the sky in the interpolated, artificial, or user-defined time zone can be independent of the actual current geographic location of the vehicle. This adjustable feature can be utilized to shift the visual characteristics inside the cabin to simulate presence within the destination time zone ahead of schedule.

As yet another example, the video processor(s) of the display system can render the image data such that certain visual characteristics of the virtual representation of the sky are adaptively updated in accordance with user-provided display configuration data (as described above with reference to FIG. 2). For example, the visual characteristics of the virtual sky could be controlled with a graphical user interface of the type depicted in FIG. 10. The graphical user interface 700 shown in FIG. 10 includes a takeoff (departure) location indicator 702, a landing (destination) location indicator 704, and a travel, flight plan, or timeline indicator 706 rendered as a horizontal line between the location indicators 702, 704. The graphical user interface 700 also includes an adjustable object 708 that can be manipulated to control certain visual characteristics of the displayed virtual sky. For the illustrated implementation, the adjustable object 708 is realized as a continuous line that can be moved (e.g., by a "touch and hold" gesture) to indicate a virtual time of day for the selected location or time between the takeoff and landing locations. Thus, the horizontal axis corresponds to geographical location or time along the flight path, and the vertical axis corresponds to the virtual time of day (e.g., daytime, nighttime, midday, etc.). In alternate embodiments, the graphical user interface 700 employs a discrete number of adjustment objects rather than a continuous line.

FIG. 10 depicts a display configuration that results in the following visual behavior of the virtual sky: at takeoff, the virtual sky is rendered with visual characteristics corresponding to a short time before sunset; at a point or location 712 along the flight path, the virtual sky is rendered with visual characteristics corresponding to sunrise; and at landing, the virtual sky is rendered with visual characteristics corresponding to midday. The U-shaped region of the adjustable object 708 corresponds to a transition from sunset to midnight to sunrise. The region of the adjustable object 708 between the location 712 and the landing location indicator 704 corresponds to a transition from sunrise to midday. An authorized user can manipulate the adjustable object 708 to customize the daytime/nighttime appearance of the virtual sky at selected points along the flight path. The resulting configuration data indicates the virtual time of day for the corresponding locations between the departure and destination locations. For example, the adjustable object 708 can be moved so that it resides completely below the horizontal indicator 706 and the virtual sky remains relatively dark. In contrast, the adjustable object 708 can be moved so that it resides completely above the horizontal indicator 706 and the virtual sky remains relatively bright. The graphical user interface 700 (which can be provided on a user device and/or on a device or instrument hosted by the aircraft) enables the user to customize and control certain aspects of the displayed virtual sky.

Referring again to FIG. 9, the process 600 continues by rendering the image data corresponding to the virtual representation of the sky (task 612). The rendered image data is provided to at least one display element onboard the aircraft (task 614), e.g., a display arrangement mounted to the cabin ceiling. The at least one display element is operated in an appropriate manner to display the virtual representation of the sky, based on the received image data (task 616).

If presentation of the virtual sky is terminated or the process 600 is otherwise caused to end (the "Yes" branch of query task 618), then the process 600 exits. Otherwise, the process 600 returns to task 602 such that the described routine can be repeated to refresh the virtual representation of the sky in an adaptive manner. In this way, the virtual sky can be updated and refreshed in an ongoing manner to maintain consistency with the current geographical position and/or the current attitude of the aircraft. An iteration of the process 600 can be performed at any desired refresh rate (e.g., 30 frames per second) to generate and render the content that is to be displayed onboard the aircraft during flight or during ground based operations.

EXAMPLES

Several examples of virtual skies and their visual characteristics are described above with reference to FIGS. 5-8. The examples mentioned here are not intended to be limiting, exhaustive, or restricting in any way. Additional examples are briefly mentioned below.

Enhanced or improved weather-if the actual weather outside the aircraft is rough or unpleasant or unsettling, the display system can present a virtual sky that depicts nice weather (e.g., sunny, partly cloudy, clear sky) in an attempt to alleviate passenger stress.

Dynamic and realistic response to aircraft motion—the virtual sky can be dynamically and adaptively rendered in accordance with the real-time movement of the aircraft (e.g., changes in attitude, velocity, acceleration) such that the display resembles a transparent window or sunroof. A dynamic and realistic representation of the sky could be interesting and entertaining to passengers.

Audio system integration—an onboard audio system can be cooperatively configured to operate in concert with the display system, such that appropriate sounds are generated in a synchronized manner to match visual content or the context of the virtual sky. For example, sounds of wind, rain, birds or other animals, or music that matches the visual "mood" of the virtual sky can be generated at an appropriate level within the cabin.

Manmade objects—the virtual display can be generated and rendered to include constellations of satellites or other manmade objects, to provide orbital tracking of satellites, and/or to include rockets, spacecraft, and/or other manmade vehicles in transit.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A display system for use onboard a vehicle having a cabin and a cabin ceiling, the display system comprising:
a source of vehicle status data, wherein the vehicle status data relates to current operating status of the vehicle;
at least one video processor coupled to the source of vehicle status data, the at least one video processor configured to render image data corresponding to a virtual representation of environmental scenery outside the cabin, wherein the image data is rendered based on at least some of the vehicle status data, wherein the image data includes date and time information to estimate a position of a sun and moon relative to the vehicle; and
a display element arranged on the cabin ceiling and oriented to present visual content to an occupant of the cabin, the display element coupled to the at least one video processor to receive the image data, and the display element configured to display the virtual representation of environmental scenery based on the received image data.

2. The display system of claim 1, wherein the display element is curved in accordance with a contour of the cabin ceiling.

3. The display system of claim 1, wherein:
the vehicle is an aircraft;
the vehicle status data comprises position data corresponding to current geographical position of the aircraft, and altitude data corresponding to current altitude of the aircraft; and
the at least one video processor renders the image data such that visual characteristics of the virtual representation of environmental scenery are adaptively updated in accordance with the position data and the altitude data.

4. The display system of claim 1, wherein:
the vehicle status data comprises current date and time information; and
the at least one video processor renders the image data such that visual characteristics of the virtual representation of environmental scenery are adaptively updated in accordance with the current date and time information.

5. The display system of claim 1, wherein:
the at least one video processor receives weather data that describes current weather conditions in a region near the vehicle; and
the at least one video processor renders the image data such that visual characteristics of the virtual representation of environmental scenery are adaptively updated in accordance with the current weather conditions to include visual imagery consistent with the current weather conditions.

6. The display system of claim 1, wherein:
the at least one video processor receives a destination time zone corresponding to an intended destination of the vehicle; and
the at least one video processor renders the image data such that visual characteristics of the virtual representation of environmental scenery are consistent with a view of actual environmental scenery in the destination time zone, regardless of real-time geographic location of the vehicle.

7. The display system of claim 1, wherein:
the at least one video processor estimates, based on at least some of the vehicle status data, a current position of the sun or moon relative to the vehicle; and
the at least one video processor renders the image data such that visual characteristics of the virtual representation of environmental scenery are adaptively updated in accordance with the estimated position of the sun or moon relative to the vehicle.

8. The display system of claim 1, wherein:
the vehicle status data comprises travel plan data corresponding to intended travel from a departure location to a destination location;
the at least one video processor receives display configuration data associated with a selected location between the departure location and the destination location, the display configuration data indicating a virtual time of day for the selected location; and the at least one video processor renders the image data such that visual characteristics of the virtual representation of environmental scenery are adaptively updated in accordance with the received display configuration data.

9. An aircraft comprising:
a cabin having a cabin ceiling;
a display element arranged on the cabin ceiling and oriented to present visual content to an occupant of the cabin;
a source of aircraft status data that provides aircraft status data corresponding to current operating status of the aircraft; and
at least one video processor coupled to the source of aircraft status data, the at least one video processor configured to render image data corresponding to an adaptive virtual representation of the sky, wherein the image data is rendered based on at least some of the aircraft status data, wherein the image data includes date and time information to estimate a position of a sun and moon relative to the aircraft;
wherein the display element is coupled to the at least one video processor to receive the rendered image data; and
wherein the display element is configured to display the adaptive virtual representation of the sky based on the received image data.

10. The aircraft of claim 9, wherein the display element is curved in accordance with a contour of the cabin ceiling.

11. The aircraft of claim 9, wherein:
the aircraft status data comprises position data corresponding to current geographical position of the aircraft, and altitude data corresponding to current altitude of the aircraft; and
the at least one video processor renders the image data such that visual characteristics of the adaptive virtual representation of the sky are updated in accordance with the position data and the altitude data.

12. The aircraft of claim 9, wherein:
the aircraft status data comprises current date and time information; and
the at least one video processor renders the image data such that visual characteristics of the adaptive virtual representation of the sky are updated in accordance with the current date and time information.

13. The aircraft of claim 9, wherein:
the at least one video processor receives weather data that describes current weather conditions in a region near the aircraft; and
the at least one video processor renders the image data such that visual characteristics of the adaptive virtual representation of the sky are updated in accordance with the current weather conditions to include visual imagery consistent with the current weather conditions.

14. The aircraft of claim 9, wherein:
the at least one video processor receives a destination time zone corresponding to an intended destination of the aircraft; and
the at least one video processor renders the image data such that visual characteristics of the adaptive virtual representation of the sky are consistent with a view of the sky in the destination time zone, regardless of real-time geographic location of the aircraft.

15. The aircraft of claim 9, wherein:
the at least one video processor estimates, based on at least some of the aircraft status data, a current position of the sun or moon relative to the aircraft; and the at least one video processor renders the image data such that visual characteristics of the adaptive virtual representation of the sky are updated in accordance with the current position of the sun or moon relative to the aircraft.

16. The aircraft of claim 9, wherein:
the aircraft status data comprises flight plan data corresponding to intended travel from a departure location to a destination location;
the at least one video processor receives display configuration data associated with a selected location between the departure location and the destination location, the display configuration data indicating a virtual time of day for the selected location; and
the at least one video processor renders the image data such that visual characteristics of the adaptive virtual representation of the sky are updated in accordance with the received display configuration data.

17. A display system for use onboard an aircraft having a cabin and a cabin ceiling, the display system comprising:
a source of aircraft status data, wherein the aircraft status data comprises position data corresponding to current geographical position of the aircraft, and altitude data corresponding to current altitude of the aircraft;
at least one video processor coupled to the source of aircraft status data, the at least one video processor configured to render image data corresponding to a virtual representation of the sky, wherein the image data is rendered based on the position data and the altitude data to adaptively adjust visual characteristics of the virtual representation of the sky in response to changes in the position data and in response to changes in the altitude data, wherein the image data includes date and time information to estimate a position of a sun and moon relative to the aircraft; and
a display element arranged on the cabin ceiling and oriented to present visual content to an occupant of the cabin, the display element coupled to the at least one video processor to receive the image data, and the display element configured to display the adaptive virtual representation of the sky based on the received image data.

18. The display system of claim 17, wherein:
the at least one video processor receives an interpolated time zone that is adjustable between an actual departure time zone and an actual destination time zone corresponding to an intended destination of the aircraft; and
the at least one video processor renders the image data such that the visual characteristics of the virtual representation of the sky are consistent with a view of the sky in the interpolated zone, and independent of current geographic location of the vehicle.

19. The display system of claim 17, wherein:
the at least one video processor estimates, based on at least some of the aircraft status data, a position of the sun or moon relative to the aircraft; and
the at least one video processor renders the image data such that the visual characteristics of the virtual representation of the sky are adaptively adjusted in accordance with the estimated position of the sun or moon relative to the aircraft.

20. The display system of claim 17, wherein:
the aircraft status data comprises flight plan data corresponding to intended travel from a departure location to a destination location;
the at least one video processor receives display configuration data associated with a selected location between the departure location and the destination location, the display configuration data indicating a virtual time of day for the selected location; and the at least one video processor renders the image data such that the visual characteristics of the virtual representation of the sky are adaptively adjusted in accordance with the received display configuration data.

\* \* \* \* \*